Feb. 1, 1949.    W. HUBER    2,460,580
METHOD AND DEVICE FOR FIXING AND SEALING TUBES
IN A PARTITION WALL BY USE OF FLUID PRESSURE
Filed March 18, 1943    3 Sheets-Sheet 1
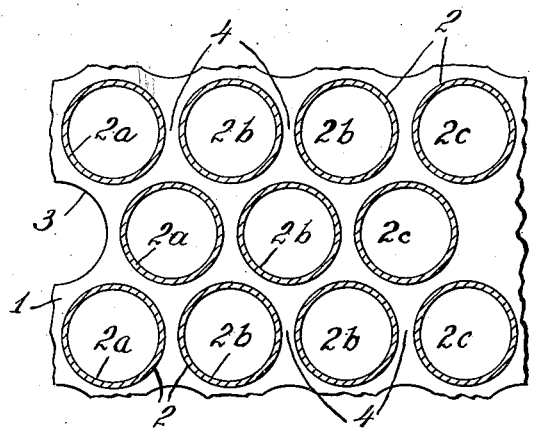
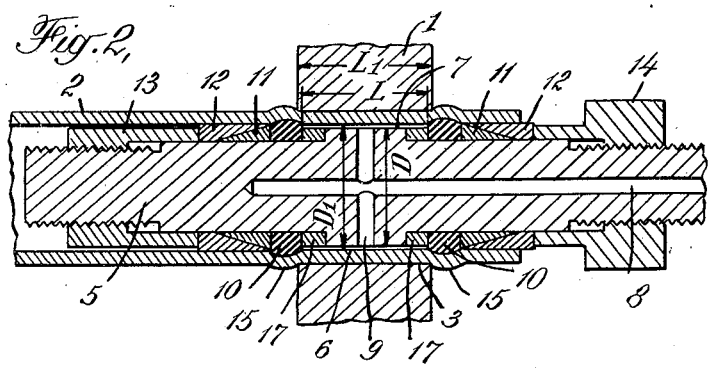
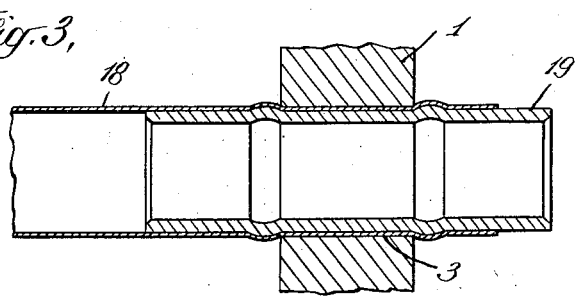
INVENTOR
Walter Huber
BY
ATTORNEYS

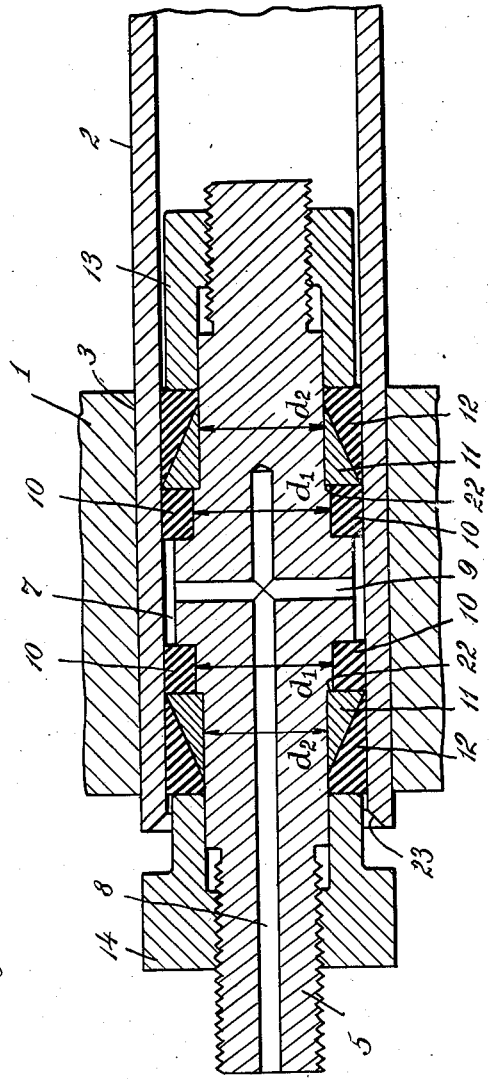
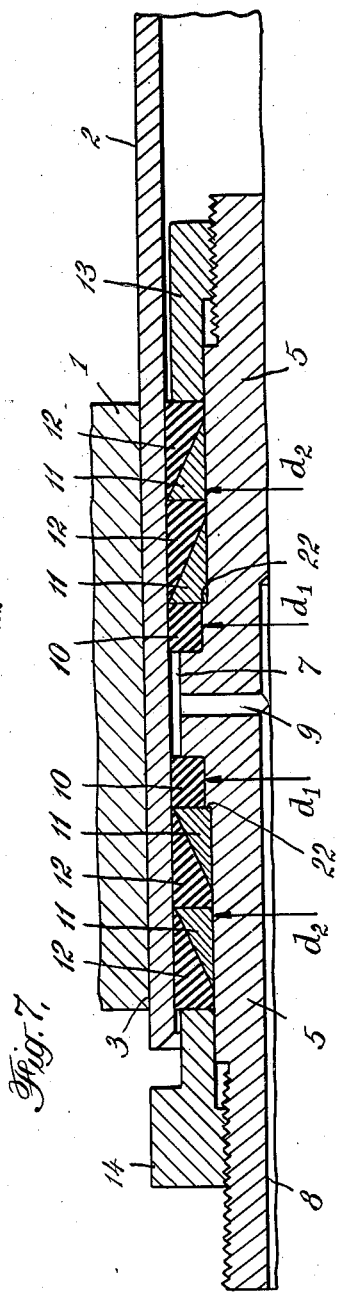

Patented Feb. 1, 1949

2,460,580

UNITED STATES PATENT OFFICE 2,460,580

METHOD AND DEVICE FOR FIXING AND SEALING TUBES IN A PARTITION WALL BY USE OF FLUID PRESSURE

Walter Huber, Winterthur, Switzerland, assignor to Sulzer Frères, Société Anonyme, Winterthur, Switzerland Application March 18, 1943, Serial No. 479,601
In Switzerland March 31, 1942

15 Claims. (Cl. 153—79)

The invention relates to a method and a device for fixing and sealing tubes in a partition wall, particularly in heat-exchangers.

It is known to connect tubes to a boiler shell plate by pressing together a flexible plastic means surrounding the tubes on every side. The known method has the disadvantage that it requires a a stamp for pressing the plastic means together, and this stamp, in conjunction with the necessary high pressure, makes necessary a pressing device of great weight. The invention consists in that the fixing and sealing is effected by a liquid or gaseous pressure means, expanding the tube and pressing it against the sides of the hole through which it passes. The device for carrying out the present method consists of a member which is pushed into the tube to be fixed and sealed, and with the tube wall forms a space into which is led the pressure means serving to expand and press the tube. The member can thereby be designed as a thickwalled tube which is enclosed at one end and fitted with a transverse bore leading into the pressure space, whereby the part bounding the pressure space has a diameter smaller than the internal diameter of the tube to be expanded; further, on each side of the pressure space a plastic or flexible sealing means is provided with two adjustable tapered rings; the outer ring is slotted and the two rings are tightened up by adjusting nuts screwed on to the tube. Also of the rings serving to support the sealing rings enclosing the space for the pressure means, those which expand with the tube wall may be made of a material with such an elasticity that they can stand being expanded by 0.5% or more without permanent deformation, for the purpose, by avoiding any damaging or replacing of the rings, to make it possible to seal many tubes successively and thereby obtain economical working.

On the drawing six examples of the subject matter of the invention are shown diagrammatically.

Fig. 1 shows part of the tube plate of a heat-exchanger.

Fig. 2 is a cross-section through tube plate and tube, and also through the device for expanding.

Fig. 3 illustrates the sealing and/or fixing of a tube of slight wall thickness by means of a bush.

Figs. 6 and 7 show a longitudinal section through the device in somewhat different form.

Figure 4:
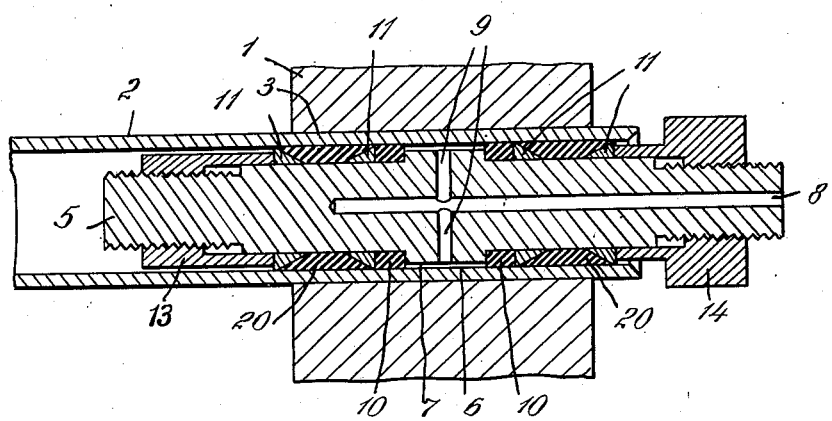
Figs. 4 and 5 show the special construction of the rings for supporting the sealing rings.

The tube plate 1, for instance of a heat-exchanger, as shown in Fig. 1, has tubes 2 which are inserted in the drilled holes 3. The dimension of the strips 4 of the metal between the holes is only a fraction, for instance ⅕, of the tube diameter. This is made possible by the tubes 2 inserted into the tube plate 1 being fixed and sealed by being pressed onto the sides of the holes by being expanded under the pressure of a liquid or gaseous pressure medium.

Such narrow strips of metal between the holes are not possible if the tubes are to be expanded-in by the methods hitherto known with the help of rollers and mandrels, at least not when a certain degree of tightness is demanded. If the strips 4 are so narrow, as in Fig. 1, no sufficiently tight seating can be obtained by the expanding-in. On the one hand the expanding-in of tubes makes it necessary for the drilled hole and the tube to be exactly cylindrical, otherwise the tube plate will be distorted when the tube is expanded-in. Only if the strip of metal between the holes has a certain minimum width, will such distortion have no effect on the neighbouring holes. If the width is less than that minimum, the distortion will cause the neighbouring holes to depart slightly from the cylindrical form, for instance because of the non-uniform character of the elasticity. These departures from the cylindrical form cause leakage at the tubes already expanded-in.

On the other hand, with the present method of pressing the tubes in by means of expanding them by the pressure of a pressure medium, a tight fit can be obtained even if the shape of the drilled hole should for instance approximate to a hexagon, under the influence of the non-uniform elasticity, the cross-section of the tube when expanded suiting itself automatically to that shape.

A further advantage consists in that the tubes 2 can easily be inserted into the tube plate 1 with some clearance. Also even if the clearance is not exactly the same at all tubes 2, i. e. if differences should exist in the diameters of the drilled holes 3 and the tubes 2, an equally great pressing pressure will be obtained nevertheless at all tubes 2. It is true that the tubes 2 will be correspondingly more or less expanded according to the amount of clearance, but they will be pressed against the side of the hole in accordance with the high pressure of the pressing medium which is the same for all tubes 2.

In the tube 2, Fig. 2, the body 5 is inserted; it forms with the tube wall 6 a space 7 which takes the pressure medium serving for expanding and pressing-on the tube 2. In addition the body 5 is constructed as a thick-walled tube for delivering the pressure medium, and has a longitudinal bore 8 which is closed at the left-hand end and a transverse bore 9 leading from the bore 8 into the pressure space 7. The part of the delivery tube 5 bounding the pressure space 7 is enlarged and has a diameter D which is only slightly smaller than the internal diameter $D_1$ of the tube 2 which is to be expanded. The enlarged portion of the body member 5 provides shoulders at each side thereof for purposes hereinafter described. The pressure space 7 is provided at both ends with a plastic or elastic sealing means, which may consist of rubber rings 10. For supporting the rings 10, two tapered adjustable rings 11 and 12 are inserted at each side, the outer of these rings 12 being slotted longitudinally of the tube. For adjusting the rings 11 and 12, adjusting nuts 13 and 14 are provided, screwed onto the delivery tube 5.

When the delivery tube 5 is inserted into the tube 2, the nuts 13 and 14 are tightened up only lightly enough to make the rings 11 rest against the rubber rings 10. After that, the pressure medium is allowed to enter the space 7, which is then under a pressure of, say, 2000 atm. The rubber rings 10 are loaded with this pressure and make the space 7 absolutely tight, whereby they push the rings 11 under the rings 12, so that the slotted rings 12 are pressed against the tube wall 6 and prevent the rubber rings 10 from being squeezed out over the tapered rings 11.

The tube 2 expands along the whole length L of the pressure space 7 and is pressed so strongly against the sides of the holes 3 in the tube plate, that after the pressing means is allowed to drain away between the tube 2 and the hole 3 in the tube plate, the tube still continues to press onto the plate with the necessary force.

The length L of the pressure space 7 between the packing rings 10 bears such a proportion to the length $L_1$ of the hole 3 that the packing rings 10 are nearly outside the drilled holes 3. Consequently the tube 2 becomes somewhat bulged at both sides of the drilled hole 3 at the edges 15, so that axial displacement of the tube 2 in the hole 3 is prevented, even if the tube 2 and/or the plate 1 is loaded with a force which is greater than the frictional force produced by the pressure exerted by the tube 2 or the sides of the hole 3.

The slots in the tapered rings 12 prevent permanent deformation of these rings, and make it possible, after the pressure medium has been led away and after the nuts 13 and 14 have been again loosened, to withdraw the delivery tube 5 from the expanded tube 2 and to insert it in the next tube. For altering the length L of the pressure space 7, distance rings 17 may be inserted and abutted against the shoulders at the end of the enlarged portion of the body member 5 before the sealing rings 10.

The pressing-on pressure, which after the expanding of the tube 2 is exerted by the wall 3 of the hole on the outer surface of the tube, is dependent on the yield point of the tube material and of the yield point of the material round the hole, and also on the thickness of the tube wall.

This pressing-on pressure is all the greater, and also the tube 2 can be rendered tight against a much greater pressure, the higher the yield point of the material of the hole 3. It will also be an advantage, if the material of the drilled hole has a higher yield point than the tube material.

On the other hand, the pressing-on pressure will be smaller, in accordance as the tube wall is thinner. In the case of the tube 18 shown in Fig. 3, with a wall exceedingly thin, the tube 18 is pressed in by means of a bush 19 in the manner already described above for the tube 2. The pressing-on pressure between the tube and the hole will then depend mainly on the wall thickness of the bush 19 and can be increased as desired by choosing a bush of suitable thickness. The bulging of the tube 18 and bush 19 is also possible.

A special advantage of the invention consists in that quite a number of tubes 2, or groups of them, can be simultaneously fixed by means of a corresponding number of delivery tubes 5. During the fixing and sealing of the tubes 2 in the partition wall 1, a portion of which is illustrated in Fig. 1, it is possible and advantageous, using a number of delivery tubes 5 corresponding to the total number of tubes 2, to fix and seal all the tubes simultaneously by increasing the pressure in all of them at once. Such a simultaneous fixing of all the tubes is greatly facilitated by use of the device described. By this method of fixing and sealing, distortion of wall 1 and holes 3 is obviated and the firm and equal sealing of all tubes 2 is assured, even when the web 4 between holes 3 is relatively very small.

When the number of tubes 2 to be fixed and sealed in wall 1 is large, as it is in most commercial installations, then the number of delivery tubes 5 required for a simultaneous fixing is excessive. Substantially the same freedom from distortion of wall 1 and deformation of holes 3 is obtained if the tubes 2 are affixed in groups in such a way that the pressure being applied at any time to any group of tubes never exceeds that already applied to neighboring holes or tubes by an amount such as to cause distortion of the wall 1. Thus, for example, in Fig. 1, the group of tubes $2c$ first may receive one increment of pressure. In the next operation the group of tubes $2b$ may receive one increment of pressure while group $2c$ is receiving two increments of pressure. In the following operation the group of tubes $2a$ may receive one increment of pressure while group $2b$ is receiving two increments of pressure, and group $2c$ is receiving three increments of pressure; and so on until all of the tubes have been fastened in the partition wall with the desired degree of expansion. Thus the pressure differential between neighboring groups of tubes 2 or holes 3 never exceeds the amount necessary to produce deformation of webs 4, but the final pressure used for sealing may be made sufficient to insure structural and fluid-tight integrity under the most rigorous service. It is understood that the use of Fig. 1 to illustrate the method described is by way of example and that the method is not limited by the number or arrangement of tubes and holes shown in that figure, nor to the use of a particular number of distinct increments of pressure. The number of increments required will vary with the amount of final pressure needed and strength of the web between holes.

Fixing the tubes step by step is done by raising the pressure, e. g., from 1 atmosphere to 1000 atm. and then keeping the pressure constant for a definite time, thereafter raising the pressure to 1500 atm., keeping it constant for another period and then taking the final pressure as a last step. The result is perfectly equal tightening all around the tubes and no overstraining of the tube material.

Since the tubes can be arranged considerably closer than has hitherto been the case in heat-exchangers passing heat between two gaseous substances at different pressure, for instance in the heat-exchangers of gas turbine plants, this gives the advantage that the tubes can be placed so close together that the gas at a higher pressure can flow over the outside of the tubes and the gas at a lower pressure through the inside of the tubes. This makes it possible for the cross-sectional area of flow on the outside between the tubes to be chosen smaller than the cross-sectional area of flow through the inside of the tubes. That gives also the advantage that a very great heat-exchange surface can be located within a certain space and that the gas at a higher pressure can act on the tube plates in such a way that the tubes are stressed in tension. In consequence of that, the tubes support the tube plates. Special precautions for supporting the flat tube plates against high pressures acting on them are then superfluous.

Figure 5:
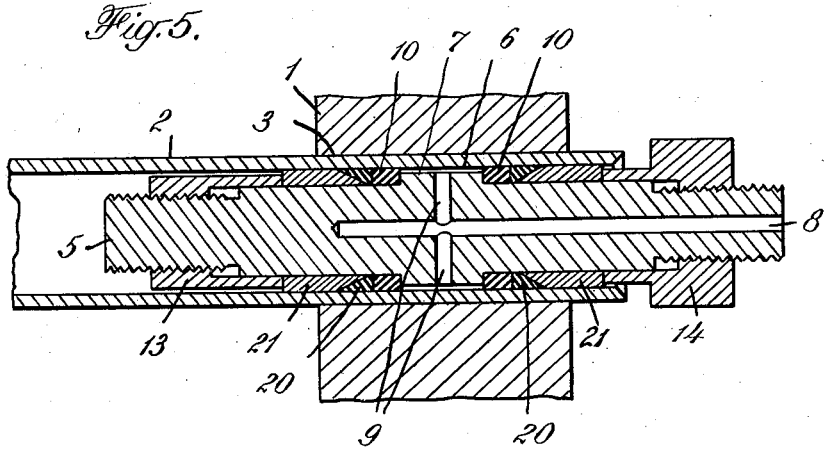

Also in Figs. 4 and 5, when the device 5 is pushed into the tube 2, the adjusting nuts 13 and 14 are only so lightly tightened up that the rings 11 come to lie on the rubber rings 10 and the rings 20 on the tube wall 6. If now the pressure medium for instance at 2000 atm. is allowed to enter the case 7, the diameter of the tube 2 is increased, since a certain clearance is necessary in the hole 3 in order to insert the tube 2. This expansion may for instance amount to 0.5 to 4% of the original diameter. The rings 20 also expand with the tube wall, since only in this manner is it possible to prevent the packing rings 10, which consist of rubber, from being squeezed out and damaged.

For the rings 20 it is necessary to have a special material which, with sufficient tensile strength to be able to stand the load caused by the pressure of 2000 atm., must have such elasticity that it can stand being expanded as mentioned above without any permanent deformation. Since steel becomes permanently deformed when expanded more than 0.5%, it cannot be considered as a suitable material for the rings 20; on the other hand hard rubber or some other material could be adopted.

In Fig. 5 the packing rings 10 rest directly on the tapered rings 20 which expand with the wall of the tube 2 and consist for instance of hard rubber. The rings 20 work together with the counter-rings 21, which are held by the nuts 13 and 14.

Through the invention the advantage is obtained that in spite of the high pressure and of the considerable expansion, the space 7 is rendered perfectly tight against the outside, and that further neither the packing rings 10 nor the tapered rings 20 are damaged, and that above all, when the pressure is released, the rings 20 regain the diameter which they had at the beginning before the pressure medium was introduced, so that the whole device 5 can easily be withdrawn from the tube 2 and inserted into a neighbouring tube without the rings 10 and 20 having to be changed for new ones. In this way an easily handled tool is obtained with which the work can be quickly done.

In the region of the packing rings 10 in Fig. 6, the part 5 has a diameter $d_1$ which is greater than the diameter $d_2$ at the place where the tapered supporting rings 11 and 12 rest on the part 5. In consequence a shoulder 22 is formed. The method of working is as follows: If the pipe 2 is somewhat smaller in diameter or oval, then the part 5 being pushed into the tube 2 the first supporting ring 12 at the righthand side will push somewhat and will press to the left on the supporting ring 11. The latter rests on the shoulder 22, thereby giving the ring 12 the necessary support so that, when introducing the ring 12 through the chamfered opening 23, it is pressed to a size corresponding to the internal diameter of the pipe 2. The packing ring 10 consisting of soft rubber is consequently not loaded and pressed together, so that its outer diameter is not increased and it can be pushed into the tube 2 easily and without being damaged.

If the shoulder 22 were not present, the soft packing ring 10, when being pushed in would be strained by the pressure of the rings 11 and 12 and its outer diameter would then become considerably greater than the internal diameter of the tube 2. This would make it more difficult to introduce the part 5 into the tube 2 and might under certain conditions excessively squeeze and damage the packing ring 10.

The case is similar also when removing the part 5 from the tube 2. If the lefthand supporting ring 12 somewhat seizes in the non-widened end of the tube 2, the lefthand packing ring 10 would be much pressed together if the shoulder 22 were absent, and the pulling out of the part 5 would then mean damaging the packing ring 10. Because of the shoulder 22, this pressing-together can no longer occur, since the resistance of the lefthand supporting ring 12 is transmitted to the ring 11 and then by the latter to the shoulder 22.

In Fig. 7 the part 5 is provided with two pairs of tapered supporting rings arranged behind each other at both sides of the pressure space 7, in order to improve the sealing. The arrangement of two or more pairs at each sealing position may be necessitated by special circumstances, as for instance a very high pressure. The tapered rings 11 and 12 can be made of steel, the tapered rings 12 being slotted, or the supporting rings 12 which expand with the tube wall may be made of a material which does not have any permanent deformation when expanded by 0.5% or more; a suitable material, for instance, would be hard rubber.

I claim:

1. Apparatus for fixing and sealing a tube in a partition which comprises a body member to be inserted into the tube to be fixed, a pair of sealing means surrounding the body member and forming between them a space around the body member, means whereby a fluid under pressure may be introduced into said space, radially expandable means mounted on the body member for supporting said sealing means on the side thereof opposite to said space, and means on the body member for holding said supporting means against axial movement.

2. Apparatus according to claim 1 in which the sealing means are in the form of sealing rings, and there are at least two adjustable tapered rings forming a support for each sealing ring at the side thereof remote from said space, and in which the outer of said tapered rings is slotted.

3. Apparatus according to claim 1 in which the sealing means are in the form of sealing rings, and there are at least two adjustable tapered rings forming a support for each sealing ring at the side thereof remote from said space, and in which the outer of said tapered supporting rings expands with the tube wall and is formed of material of such elasticity that it can withstand an elongation of at least 0.5% without permanent deformation.

4. Apparatus according to claim 1 in which the sealing means are in the form of sealing rings, and there are at least two adjustable tapered rings forming a support for each sealing ring at the side thereof remote from said space, and in which the outer of said tapered supporting rings expands with the tube wall and is formed of hard rubber.

5. The method of fixing and sealing a plurality of tubes in a partition wall which comprises inserting each tube in a hole in the partition wall, forming a space inside the tube within the wall hole, sealing said space at both ends, supporting the sealing means outside the space by radially expandable means, and introducing into said space a fluid under sufficiently high pressure to enlarge the tube and simultaneously radially expand the sealing means and its support to such an extent as to bring the support to bear on the tube wall during the enlargement of the tube wall.

6. The method of fixing and sealing a plurality of thin tubes in a partition wall having holes therein which comprises inserting the tubes in holes in the partition wall, inserting a bush into each tube at such position that it lies within the wall hole and extends at each side thereof, forming a space inside of each bush, within the wall hole, sealing said space at both ends, supporting the sealing means outside the space by radially expandable means, and introducing into said space a fluid under sufficiently high pressure to enlarge the bush and surrounding tube and simultaneously expand the sealing means and its support to such an extent as to bring the support to bear on the inside wall of the bush during the enlargement of the bush and the surrounding tube.

7. The method of fixing and sealing a plurality of thin tubes in a partition wall having holes therein which comprises inserting the tubes in holes in the partition wall, inserting a bush into each tube at such position that it lies within the wall hole and extends at each side thereof, applying fluid under pressure to the inside of each bush, within the wall hole, progressively increasing the applied pressure in increments to cause expansion of the bushes and the surrounding tubes to their final position in the respective wall holes to take place in steps, and simultaneously and similarly subjecting adjacent tubes to similar expansion within their respective holes.

8. The method of fixing and sealing a plurality of tubes in a partition wall having holes therein which comprises inserting the tubes in holes in the partition wall, subjecting the inside of each of a selected group of the tubes, and within the wall openings, to fluid under pressure sufficient only to partially expand the tubes of said group to their fixed positions in the respective holes, similarly partially expanding a second selected group of tubes positioned adjacent said first selected group to fluid under pressure sufficient only to partially expand them within their respective holes, and, only after said second selected group of tubes have been partially expanded into their respective holes, similarly subjecting each of the tubes of the first selected group to fluid under greater pressure and sufficient to fix them in their final position in the partition wall.

9. The method of fixing and sealing a plurality of tubes in a partition wall having holes therein which comprises inserting the tubes in holes in the partition wall, applying fluid under pressure to the inside of each tube, within the wall holes, progressively increasing the applied pressure in increments to cause expansion of the tubes to their final position in their respective wall holes to take place in steps, and simultaneously and similarly subjecting adjacent tubes to similar expansion within their respective holes.

10. The method of fixing and sealing a plurality of tubes in a partition wall having holes therein which comprises inserting the tubes in holes in the partition wall, applying to the inside of each of a selected group of tubes, and within the wall openings, fluid pressure sufficient in amount only to partially expand said selected group of tubes into their respective holes, applying to the inside of each of a second selected group of tubes positioned adjacent said first selected group of tubes, and within the wall openings, a fluid pressure sufficient in amount only to partially expand them into their respective holes while simultaneously similarly subjecting said first selected group of tubes to a higher fluid pressure to further expand them into their respective holes.

11. A device for fixing and sealing tubes in a partition wall which comprises a thick-walled body member with adjusting nuts at the ends, said body member having a passage into which a liquid under pressure may be introduced, two pairs of cooperating tapered rings over the body member, one tapered ring of each pair being in engagement with its corresponding nut, at least one tapered ring of each pair being slotted, a pair of annular shoulders on the body member, two elastic packing rings over the body member, one between each shoulder and its cooperating adjusting nut, a part of the body member, one adjusting nut, the shoulders, the tapered rings and the packing rings being insertable into the tube, there being a pressure space between the packing rings, the body member and the tube, a duct connecting the pressure space with said passage in the body member, the device being positionable in a tube in a partition wall so that pressure in the pressure space expands the tube against the partition wall.

12. A device according to claim 11 in which a spacing ring is positioned between each packing ring and a shoulder to adjust the location of the packing rings with respect to the edges of the partition wall.

13. A device for fixing and sealing a tube in a partition wall which comprises a body member, said body member having an enlarged portion forming annular shoulders at each end thereof, an elastic packing ring over the body member at each side of said enlargement, tapered yieldable supporting means in engagement with each packing ring, adjusting means on the body member for fixing the position of the packing rings with respect to the shoulders, the body member, the tapered supporting means and the packing rings being insertable into a tube, there being a pressure space between said enlargement of the body member and the tube when the body member is inserted in the tube, means for admitting liquid under high pressure to the pressure space, and means for adjusting the width of the pressure space with respect to the thickness of the partition wall.

14. A device according to claim 13 in which adjusting means are provided for positioning the packing rings under the edges of the partition wall, whereby on introduction of liquid under pressure to the pressure space the tube is bulged at said edges.

15. A device according to claim 13 in which the yieldable supporting means comprises a tapered elastic ring on each side of the enlargement and at least one tapered metal ring in engagement with each tapered elastic ring, and in which means are provided whereby pressure in the pressure space acts to force the tapered metal rings against the tapered elastic rings and to hold the outer periphery of the elastic rings against the tube.

WALTER HUBER.

REFERENCES CITED

The following references are of record in the file of this patent:

UNITED STATES PATENTS

| Number | Name | Date |
|---|---|---|
| 605,195 | Birtwisle | June 7, 1898 |
| 633,430 | Crowden | Sept. 19, 1899 |
| 1,050,102 | Campbell | Jan. 14, 1913 |